United States Patent Office 3,165,490
Patented Jan. 12, 1965

3,165,490
NON-ELECTROSTATIC VINYL RESIN
COMPOSITION
Taizo Uno, Tarumi-ku, Kobe, and Masaharu Yuasa, Nakagyo-ku, Kyoto, Japan, assignors to Tanabe Seiyaku Co., Ltd., Higashi-ku, Osaka, Japan
No Drawing. Filed May 17, 1962, Ser. No. 195,389
4 Claims. (Cl. 260—31.8)

This invention relates to improved vinyl resin fabricating compositions and methods of making same, and particularly to such fabricating materials which decrease the tendency to collect electrostatic charges.

It has been known that many articles made of vinyl resin such as vinyl chloride polymers and copolymers display a marked tendency to collect electrostatic charges. This tendency is very objectionable in that it causes the articles to attract fine dust particles from the atmosphere. Furthermore, the generation of high electrostatic charges in the process of fabrication or handling such articles sometimes causes various troubles, such as shock, ignition of inflammable solvents, etc.

Many additives for rendering vinyl resins destaticized are known. Many of these additives tend to undesirably affect the physical or chemical properties of the plastics, such as color, transparency, or heat- and light-stability. They also tend to have incomplete compatibility with the resins and therefore incorporation in the resins by a mill is very inconvenient or, in the alternative, exudation from the composition may occur on long standing.

According to this invention we have found that dialkyl aspartate or glutamate in which the alkyl groups contain 4 to 12 carbon atoms impart highly desirable antistatic properties to vinyl resin compositions when incorporated therein.

The above-mentioned additives do not undesirably affect the physical or chemical properties of the plastics and, further, have a compatibility with numerous resins. They can be easily incorporated in the resins by standard processes, such as by mill, Banbury or dry powder mixing and the resultant products may easily be fabricated by conventional methods such as extrusion, molding or calendering. In addition to the foregoing advantages the additives of our invention have other advantages for use in compounding of the plastics. One such advantage is that they may be used as a plasticizer for polyvinyl chloride resins. It was found that the di-alkyl aspartate and glutamate as defined above are equivalent to or somewhat better than commercial di(2-ethylhexyl) phthalate as plasticizers. Another advantage of such additives is that they are non-toxic and odorless, so that they are useful as plasticizers for resins used in the food-industry.

This invention does not depend on deliquenscent action of the additives hitherto employed, and therefore, the destaticizing agents of the invention will not be eluted with water. This advantage is very important for retaining the antistatic property of the composition for a long time.

In preparing the new composition of this invention there may be employed any di-alkyl aspartate or glutamate in which the alkyl groups contain 4 to 12 carbon atoms. Illustrative examples of such esters are dibutyl, dihexyl, di-octyl, di(2-ethylhexyl), didecyl, dilaryl aspartate or glutamate. Specific dialkyl aspartates or glutamates which are especially useful for the purpose of this invention are di-octyl aspartate, di(2-ethylhexyl) aspartate and dibutyl glutamate.

The lower limit of the quantity of the additive employed is about 3% by weight based on the weight of the polymer, and the upper limit is a matter of choice dictated by economy. However, preferably the quantity is between 5 to 10%, but, as noted supra, is not critical. For example 50% or more may be used and the desired destaticizing result is obtained, although at higher concentrations the products obtained are substantially plasticized without any conventional plasticizers. But at lower concentrations rigid resins can be prepared for unplasticized purposes.

While the destaticizing agents can be incorporated in the resins in any desired manner, it is preferable to employ a standard milling process. The additive and powdered resin are milled to form a mass. Other ingredients such as a plasticizer, pigment, stabilizer or filler may be incorporated therein if desired or necessary. Then the mass may be fabricated into various forms, such as molding granules, films, sheets, etc., by well known fabricating methods.

This invention is particularly useful for destaticizing vinyl chloride polymers and copolymers, such as polyvinyl chloride, vinyl chloride-vinyl acetate copolymer. For testing the effectiveness of the additive, the resulting article may be abrased with dried cotton fabric and several pieces of paper disk weighing about 4 mg. brought to a distance of 1 cm. or 5 cm. If the article is charged, the disks will be attracted to the article for a long period of time.

The invention will now be illustrated by the following examples in which all parts are by weight unless otherwise indicated.

Example 1

100 parts of polyvinyl chloride powder (Geon 103 EP), 50 parts of dioctyl phthalate, 1.5 parts of barium stearate, 1.5 parts of cadmium stearate, and 5 parts of dibutyl glutamate are kneaded and milled for 5 minutes to form a mass at 160° C. The resulting mass is then calendered for sheeting.

As a control, the same procedure is carried out without using a destaticizing agent. The test, explained supra, showed the absence of charged areas at each distance but the control-specimen attracted many pieces of paper at each distance for more than 5 minutes.

Example 2

The procedure of Example 1 is repeated with the exception that 50 parts of di(2-ethylhexyl) aspartate is used in place of di-octyl phthalate and dibutyl glutamate. When tested as in Example 1 the antistatic property of the product was found to be almost equal to the product of Example 1.

The mechanical properties of the product are as follows:

| Specimens | Tensile strength, kg./cm.$^2$ | Elongation, percent |
|---|---|---|
| Product of Example 2 | 1.96 | 433 |
| Control | 1.86 | 363 |

(The tensile speed, 12.5 cm./minutes; at 20° C.)

What we claim is:

1. A composition of matter consisting essentially of polyvinyl chloride resin and a destaticizing effective amount of a compound selected from the group consisting of di-alkyl aspartate and di-alkyl glutamate wherein each of said alkyl groups contains 4 to 12 carbon atoms.

2. The composition of claim 1 wherein the amount of destaticizing agent is from 3 to 50% by weight based on the weight of the polymer.

3. The composition of claim 1 wherein said di-alkyl aspartate is di(2-ethylhexyl) aspartate.

4. The compositions of claim 1 wherein said di-alkyl glutamate is dibutyl glutamate.

No references cited.

ALEXANDER H. BRODMERKEL, *Primary Examiner.*
MORRIS LIEBMAN, *Examiner.*